United States Patent [19]
Browning et al.

[11] Patent Number: 5,717,926
[45] Date of Patent: Feb. 10, 1998

[54] EFFICIENT FORKING OF A PROCESS

[75] Inventors: Luke Matthew Browning; Olivier Alain Denis Cremel; Jeffrey Scott Peek, all of Austin, Tex.

[73] Assignee: International Business Machines Corporation, Armonk, N.Y.

[21] Appl. No.: 704,336

[22] Filed: Aug. 28, 1996

Related U.S. Application Data

[63] Continuation of Ser. No. 396,309, Feb. 28, 1995, abandoned.
[51] Int. Cl.$^6$ .................................................. G06F 9/46
[52] U.S. Cl. ................................ 395/674; 395/673
[58] Field of Search ................................ 395/671, 672, 395/673, 675, 674

[56] References Cited

U.S. PATENT DOCUMENTS

| | | |
|---|---|---|
| 4,812,981 | 3/1989 | Chan . |
| 4,849,877 | 7/1989 | Bishop . |
| 4,901,231 | 2/1990 | Bishop . |
| 5,159,687 | 10/1992 | Wengelski . |
| 5,247,673 | 9/1993 | Costa . |
| 5,313,647 | 5/1994 | Kaufman . |
| 5,339,415 | 8/1994 | Strout, II et al. . |
| 5,404,521 | 4/1995 | Murray . |

OTHER PUBLICATIONS

"Fork Clone Address Space Implementation on MVS", IBM Technical Disclosure Bulletin, vol. 35, No. 6, Nov. 1992, pp. 363–367.

Primary Examiner—Alvin E. Oberley
Assistant Examiner—Alice Y. Park
Attorney, Agent, or Firm—Diana L. Roberts; Andrew J. Dillon

[57] ABSTRACT

A computer-implemented method, computer system, and memory for performing a fork operation of a parent process is provided. The parent process includes one or more threads, each having a kernel stack. The method includes the steps of locating the kernel stacks in a first memory location (e.g., segment 1) if the parent process is multi-threaded, in response to an initiation of a fork by a calling thread, switching the kernel stack of the calling thread to a second memory location if the parent process is multi-threaded, and copying the second memory location (e.g., segment 2) to create a child process.

10 Claims, 4 Drawing Sheets

EFFICIENT FORKING OF A PROCESS

This is a continuation of application Ser. No. 08/396,309 filed Feb. 28, 1995, now abandoned.

BACKGROUND OF THE INVENTION

1. Field of the Invention

The present invention relates to operating system environments and, more particularly, to efficient forking of a process.

2. Background Information and Description of the Related Art

For background purposes, this section includes a general description of a conventional UNIX™-based computing system.

Virtual Memory: Conventional UNIX-based computing systems typically utilize virtual memory. Virtual memory extends the effective size of the computing system's real memory by utilizing disk space to simulate additional real memory. The computer system's operating system may divide virtual memory into large units, called segments (e.g. 256M bytes each), and then further divide those segments and real memory into smaller units, called pages (e.g. 4K bytes per page).

Critical Sections: Conventional UNIX-based computing systems typically include "critical sections" of code and/or shared data structures, such as shared libraries, whose integrity is extremely important for correct system operation. Operating systems may incorporate software blocking and/or read-only locks to "serialize" access to those critical sections. Blocking locks cause a thread (described herein) requesting the critical sections to cease executing, i.e., to go to "sleep", if another thread currently holds the lock. However, as can be seen, the disadvantage of blocking locks is that all other threads may be suspended when the critical section is executing.

Virtual Memory Manager: Conventional UNIX-based operating systems may include a "virtual memory manager" (VMM) for tracking the addresses of pages residing in real memory (i.e. real addresses) and the virtual addresses of pages that must be retrieved from disk when referenced. To do this, the VMM creates a descriptor table for mapping virtual addresses to real addresses. However, when a virtual address does not directly map to a real address, a page fault occurs. In this case, the VMM moves page(s) in real memory to disk, retrieves the desired page(s) from disk or real memory, and stores those retrieved pages in the location of the previously moved page(s).

Pinned and Virtually Pinned Pages: A "pinned" page is a page in real memory that is flagged so that the VMM cannot move it. As such, a page fault cannot occur if the system references a pinned page. Another technique to help insure that pages will be located in real memory is to "virtually" pin those pages. To describe virtual pinning, it is important to know that when a page fault occurs, the VMM moves the least recently referenced page(s) to disk. Therefore, if the OS "touches" (i.e. references) virtual pages in a critical section, it is likely that a page fault will not occur in the critical section because those pages were recently referenced.

Processes and Threads: Conventional UNIX™-based operating systems schedule execution of various user processes on one or more microprocessors. A user process includes a set of system resources for executing one or more threads. A thread is a simple execution path through application software and the operating system. Each thread has its own kernel stack for executing system calls and kernel services on behalf of the thread. The kernel stack contains the thread's processing information, such as the automatic variable, hardware registers, and a backlink pointer to the previous stack frame. The set of system resources for the process includes code, data, each thread's kernel stack, hardware context, and process tables, all collectively referred to as "process image." Conventionally, the operating system groups most, if not all, process image information, including all kernel stacks, in one memory location (e.g., segment) so that they may be easily copied.

Fork System Call (Forkcopy): A calling thread in a user process (herein "parent process") can create a new user process (herein "child process") by initiating a fork system call. Performing the fork is rather straight forward if the parent process is single-threaded. For example, referring to FIG. 1, the OS forkcopies the parent's process image contained in kernel space 20 and user space 10 (both located in seg. 2) to create the new child process image. As a result, the operating system forkcopies seg. 2 in its entirety. However, if the operating system only permits one-to-one mapping of virtual addresses, the operating system may create a "dummy" parent. A dummy parent contains a mapping to all non-pinned pages of the parent process, having pointers to those pages by both the parent process and the child process.

Forking of a Multi-Threaded Process: Unfortunately, specific problems and disadvantages arise when a thread of a multi-threaded process attempts to initiate the fork system call. Importantly, each child process is single-threaded, even though the parent process may be multi-threaded. Accordingly, the child process inherits only the contents of the calling thread's kernel stack, i.e., it inherits no other thread's kernel stack. However, because conventional UNIX-based operating systems locate all kernel stacks of a single process in one memory location (e.g., segment), all kernel stacks of that process are forkcopied, causing several disadvantages and problems.

First, because the child process only inherits the calling thread's kernel stack, the most obvious disadvantage is that additional memory must be forkcopied.

Second, one of the non-calling threads running on its stack may be in a "disabled critical section." A disabled critical section provides a high level of serialization because the operating system disables all hardware interrupts and, therefore, page faults cannot occur. As a result, a disabled critical section must always reference pinned pages within real memory. Otherwise, the computer system could crash. However, as previously described above, the act of forkcopying a segment results in the remapping of the pages in that segment. Pages may be made read-only and associated with a dummy parent segment during a forkcopy. Consequently, if the thread in the disabled critical section references its stack, a page fault will occur.

Third, because date integrity of a disabled critical section is paramount, all referenced pages must be valid. Even if the system does not crash as a result of a page fault, the thread will be put to sleep, resulting in a loss of serialization. Another thread will be scheduled to run on the processor and this thread might reference the same data. As a result, the data could be in an inconsistent state if it was only partially updated.

Accordingly, there is a great demand for an enhanced operating system that permits a process (simultaneously executing multiple threads) to perform a forkcopy, while maintaining data integrity. Furthermore, it would be advantageous for this enhanced operating system to permit a single threaded process to perform a forkcopy without any performance degradation.

SUMMARY

Accordingly, a computer-implemented method, computer system, and memory perform an efficient fork operation of a parent process. The parent process includes one or more threads, each having a kernel stack. The method includes the steps of locating the kernel stacks in a first memory location (e.g., segment 1) if the parent process is multi-threaded, in response to an initiation of a fork by a calling thread, switching the kernel stack of the calling thread to a second memory location if the parent process is multi-threaded, and copying the second memory location (e.g., segment 2) to create a child process.

Therefore, it is an object of the present invention to provide a forking technique that does not clone a memory segment containing any kernel stack other than the calling kernel stack.

It is another object of the present invention to reduce the amount of memory that is forkcopied.

It is a further object of the present invention to optimize the forking procedure for both single and multi-threaded parent processes.

It is another object of the invention to provide a forking technique that does not suspend other threads when the calling process is forking.

It is still another object of the present invention to preserve data integrity of threads in the process that are executing concurrent to the thread executing the fork system call.

These and other objects, features, and advantages will become even more apparent in light of the following detailed description and drawings.

DETAILED DESCRIPTION OF THE PREFERRED EMBODIMENT

The following detailed description is of the best presently contemplated mode for carrying out the invention. This detailed description is not to be viewed in a limiting sense, but is made merely for the purpose of illustrating the general principles of the invention, the scope of which is only defined by the appended claims.

The preferred embodiment of the present invention includes a system, method, and memory for efficiently creating a process from a multi-threaded parent process. The preferred embodiment forms part of an enhanced UNIX-based operating system (OS) in the management and direction of workstation operations. More specifically, the preferred embodiment is implemented within the AIX™ operating system. However, one skilled in the art will readily recognize that the present invention could be implemented in any suitable operating system.

Figure 2:
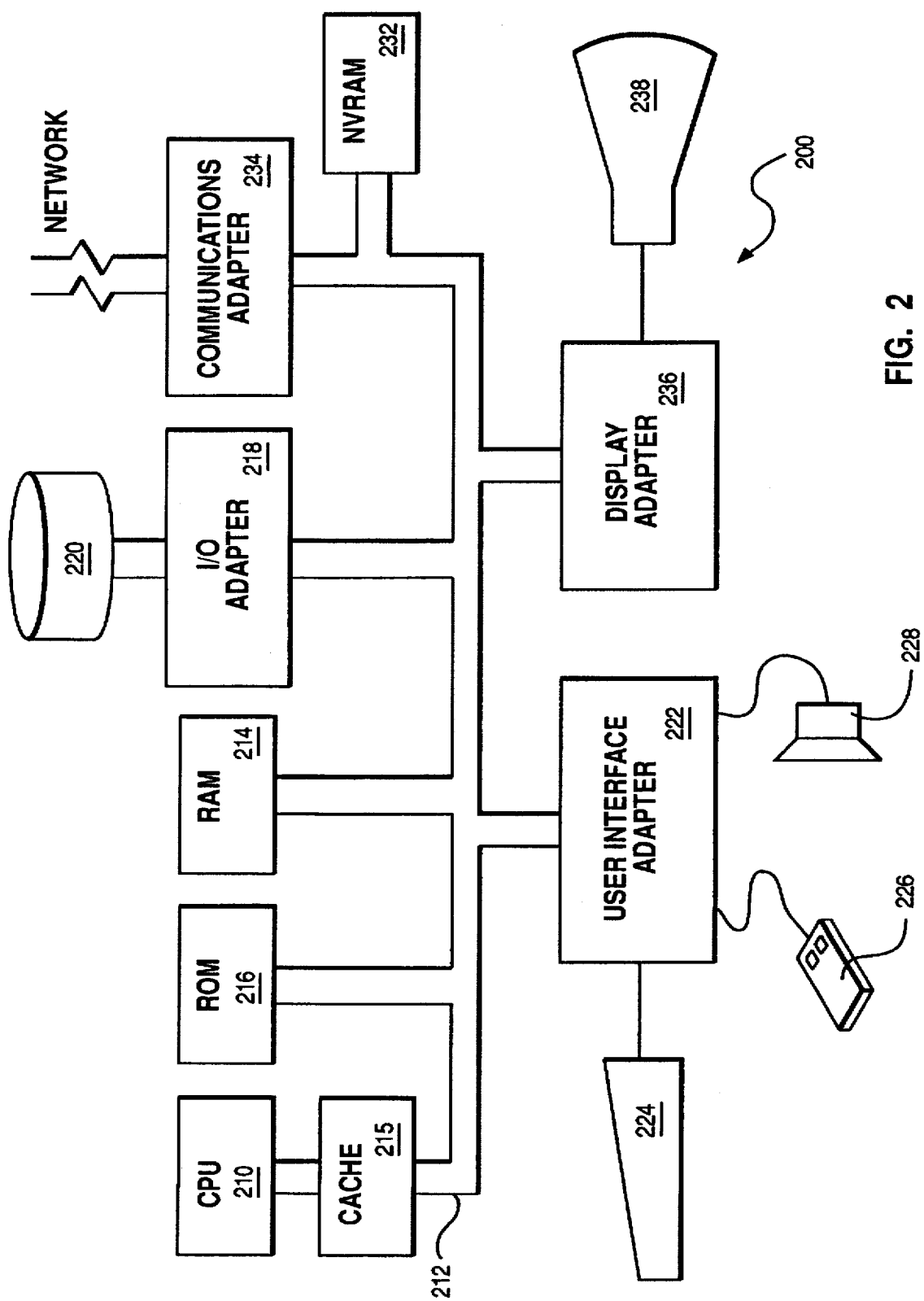
FIG. 2 illustrates a suitable hardware configuration for implementing the present invention.

The present invention may be practiced in any suitable hardware configuration, such as the hardware configuration illustrated in FIG. 2, or, alternatively, a laptop computer. Referring to FIG. 2, workstation 200 includes any suitable central processing unit 210, such as a conventional microprocessor (e. g., Intel's™ Pentium™ or IBM's PowerPC™), and a number of other units TM interconnected via system bus 212. Illustratively, workstation 200 includes random access memory ("RAM") 214, cache 215, non-volatile RAM 232, read only memory ("ROM") 216, display adapter 236 for connecting system bus 212 to display device 238, and I/O adapter 218 for connecting peripheral devices (e.g. disk and tape drives 220) to system bus 212. Workstation 200 further includes user interface adapter 222 for connecting keyboard 224, mouse 226, speaker 228, microphone 232, and/or other user interface devices, such as a touch screen device (not shown), to system bus 212. Communication adapter 234 connects workstation 200 to a data processing network.

The enhanced OS, as computer readable program code, resides within a machine-readable media (e.g., memory) to direct the operation of workstation 200. Any suitable memory may retain the enhanced OS, such as RAM 214, ROM 216, a magnetic diskette (e.g., floppy diskette), CD-ROM, magnetic tape, or optical disk (the last four being located in disk and tape drives 220). While the specification describes the OS as performing the features of the invention, in actuality, the OS merely provides the instructions for the microprocessor to perform those features.

Figure 3:
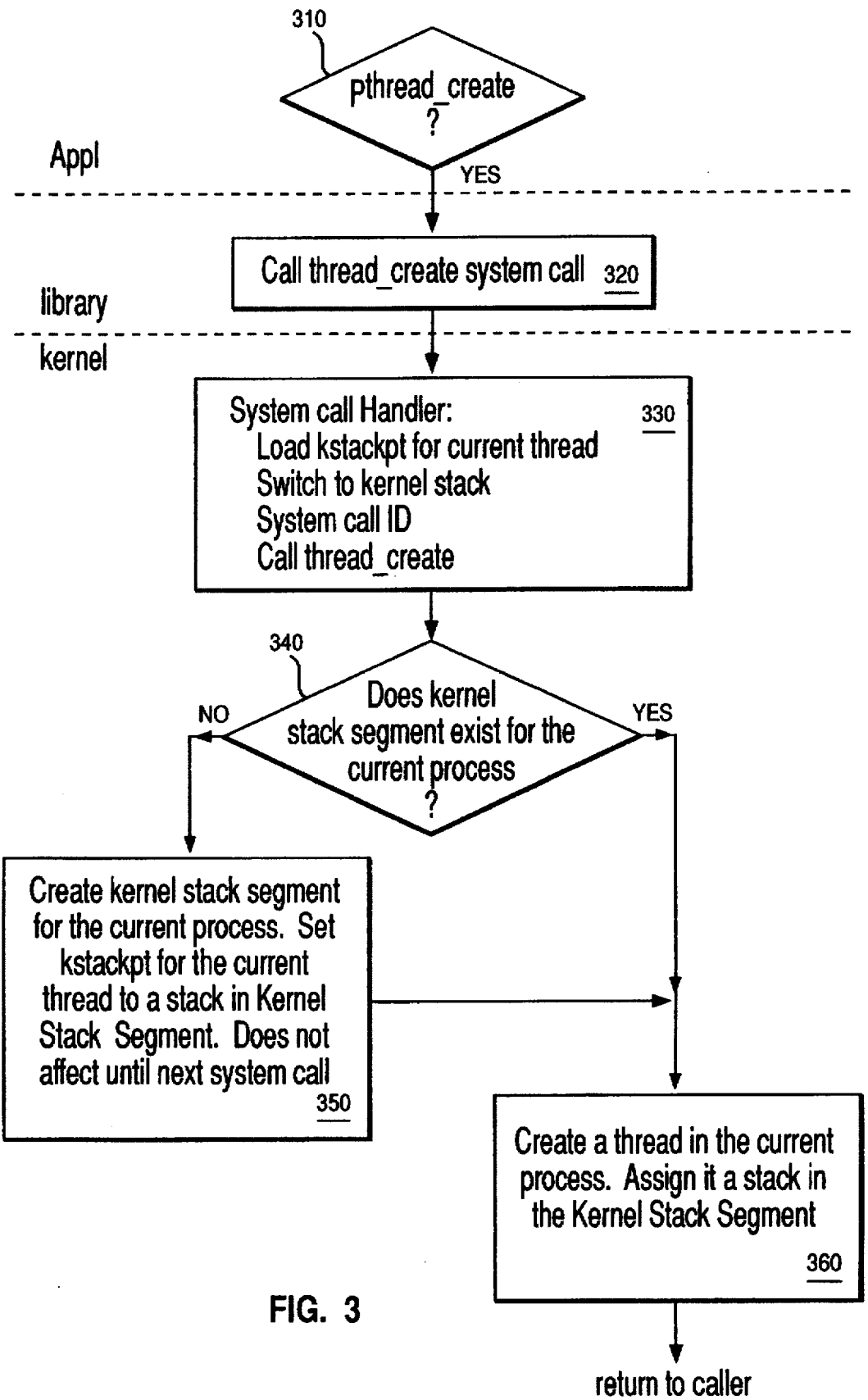
FIG. 3 illustrates detailed logic for creating an additional thread in a process.

FIG. 3 illustrates detailed logic for creating an additional thread in a process. Referring to FIG. 3, at 310, the user process calls a thread library. This library contains a library of functions and is an extension of the kernel. For example, the library transfers user system calls into an appropriate sequence of kernel system calls.

Figure 1:
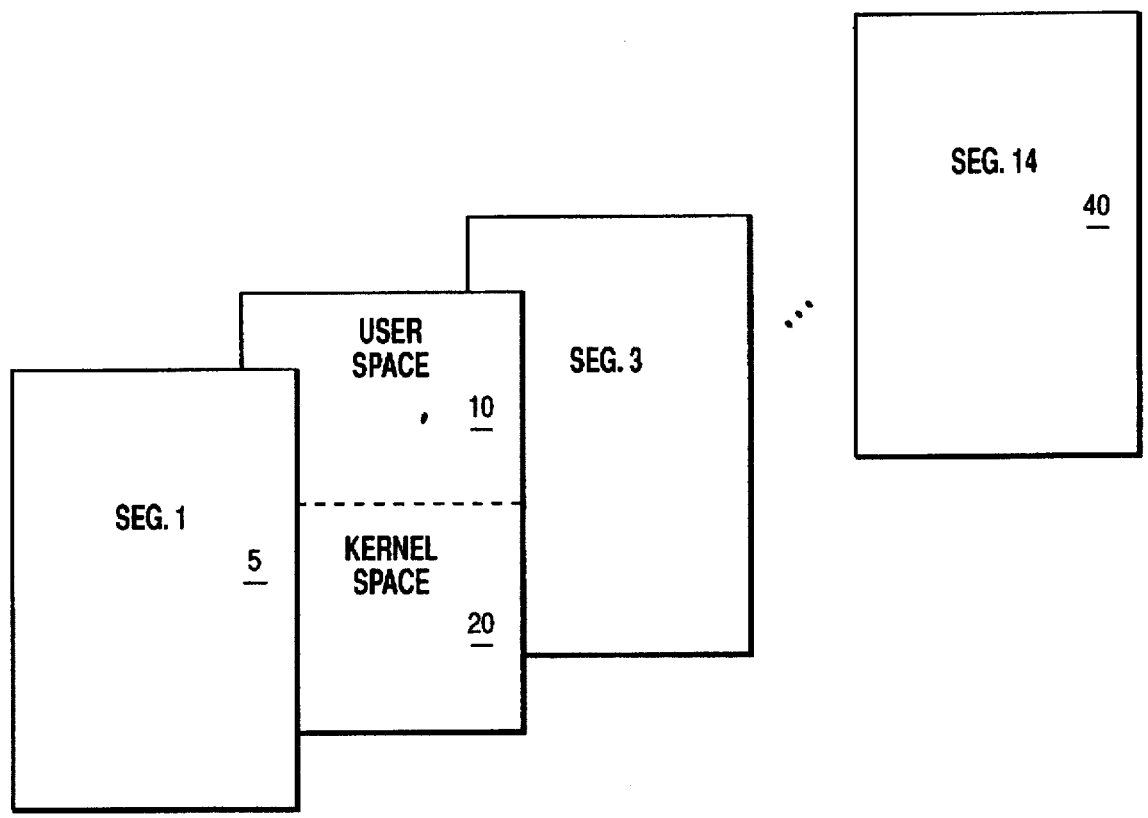
FIG. 1 illustrates a prior art block diagram of virtual memory.

In turn, at 320, the thread library issues a thread-create system call. In response, at 330, the system call handler examines a current process data structure in segment 14 (see 40 in FIG. 1) to determine if segment 1 (see 5 in FIG. 1) exists. The current process data structure contains segment definitions and information common to all thread(s) of the current process. If segment 1 exists, the system call handler maps segment 1 into memory. Next, the system call handler examines the current thread data structure located in segment 14 and switches to a kernel stack identified by that data structure. Therefore, the system call handler switches from a user stack defined by the process to the identified kernel stack and uses it for subsequent calls in the kernel. If the current process is single threaded, the current thread's kernel stack is located in kernel space 20 of segment 2, which is the default kernel stack. If the current process is multi-threaded, the current thread's kernel stack will be located in segment 1 (described herein). Next, the system call handler issues a thread create call.

At 340, the kernel examines the current process data structure in segment 14 to determine if a kernel stack segment (i.e., segment 1) exists for the current process. As previously described, the current process data structure contains segment definitions of the current process. Therefore, if the kernel stack segment does not exist, the second thread of the process is being created. That is, the current process is single threaded. Control is then directed to 350. However, if the kernel stack segment does exist, control is directed to 360.

At 350, the kernel creates a kernel stack segment (e.g., seg. 1) for the current process and allocates a kernel stack in the kernel stack segment for the current thread. The kernel then sets a kernel stack pointer in segment 14 to the kernel stack for the current thread. Accordingly, each thread has a defined kernel stack location in the kernel stack segment. This setting does not take affect until the next system call.

At 360, the kernel creates a new thread in the current process by copying the calling thread data structure (i.e., the data structure defining the calling thread, located in segment 14) in its entirety and assigns it a kernel stack in the kernel stack segment (e.g., segment 1). The kernel then returns control to the caller (i.e. user process). Accordingly, the default kernel stack in kernel space 20 of segment 2 is free.

Figure 4:
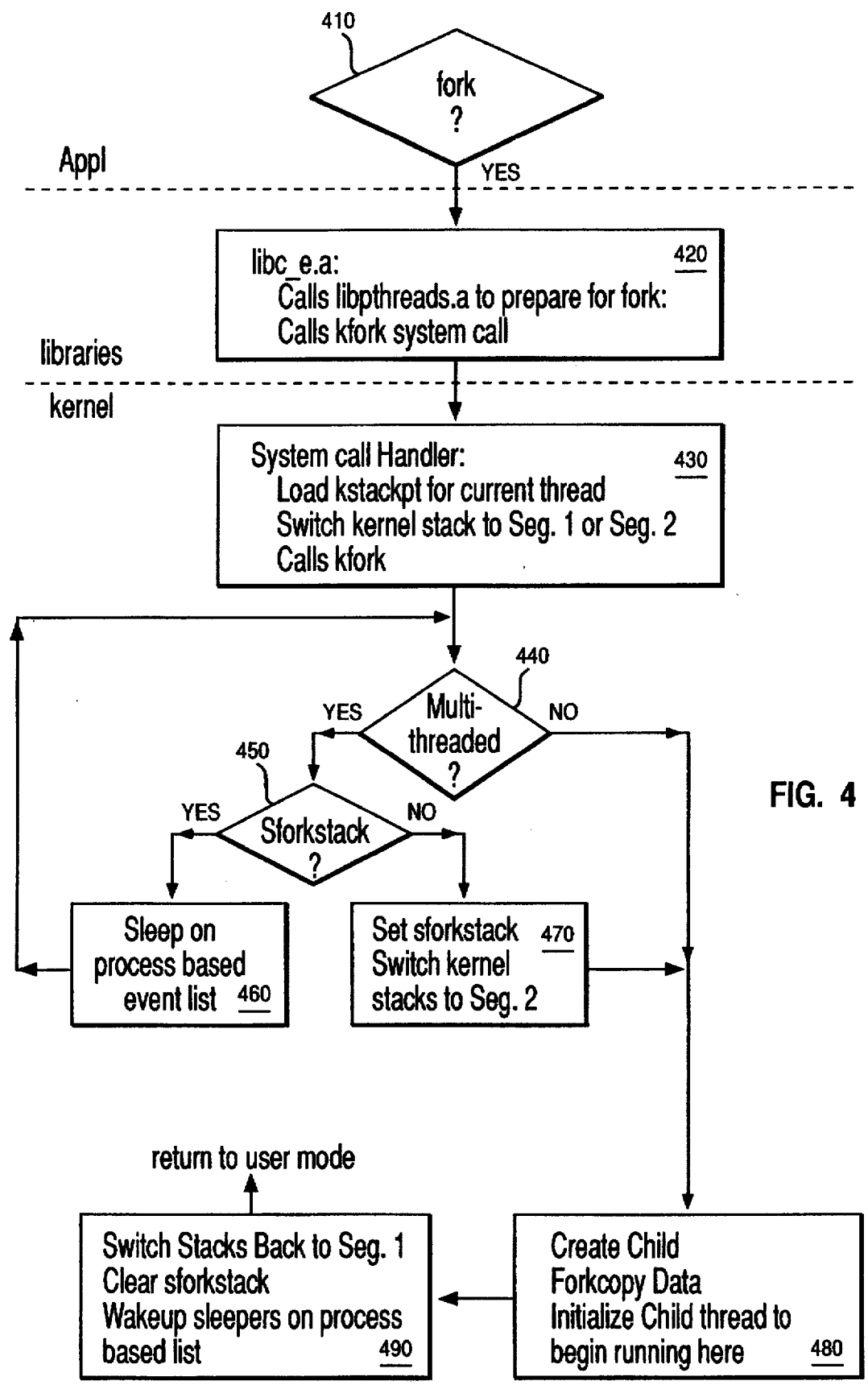
FIG. 4 illustrates detailed logic for performing a fork operation.

FIG. 4 illustrates detailed logic for performing a fork operation of a current (i.e., calling) process. The current process may be multi-threaded or single threaded. At 410, the process decides to initiate forking of a new child process. At 420, the process calls a thread library to prepare for a fork. This thread library contains a library of functions and is an extension of the kernel. The process issues the KFORK system call to transfer the fork system call into an appropriate sequence of kernel system calls.

At 430, the system call handler examines the current process data structure in segment 14 to determine if segment 1 exist. If segment 1 exists, the system call handler maps segment 1 into memory. Next, the system call handler examines the current thread data structure located in segment 14 and switches to a kernel stack identified by that data structure. Therefore, the system call handler switches from the user stack defined by the process to the identified kernel stack and uses it for subsequent calls in the kernel. Again, if the current process is single threaded, the current thread's kernel stack is located in segment 2, which is the default kernel stack. If the current process is multi-threaded, the current thread's kernel stack will be located in segment 1. The system call handler then calls the KFORK system call.

At 440, the kernel determines if the calling process is multi-threaded. To do this, the kernel examines a count in the calling process data structure located in segment 14. If the process is multi-threaded, at 450, the kernel checks a flag, called SFORKSTACK, in the current process structure found in segment 14. If this flag has been set, at 460, the thread sleeps on a process-based event list. That is, the thread will cease processing until the SFORKSTACK flag clears. Control then returns to 440. The calling thread resumes from sleep when another thread finishes executing either a fork, exit, or exec call.

Returning to 450, if the SFORKSTACK flag was not set, at 470, the kernel sets the SFORKSTACK flag and switches kernel stacks from segment 1 to the location of the previously empty default kernel stack in segment 2. At 480, the kernel creates the child process by copying segment 2 in its entirety. The kernel also initializes the child thread to begin running and, at 490, switches the kernel stack back to segment 1, clears the SFORKSTACK flag, and wakes up any sleepers on the process based list. Control then returns to the user mode.

We claim:

1. A computer-implemented method for performing a fork operation of a parent process having at least two threads, wherein one thread is a calling thread, comprising the steps of:
   (a) assigning each thread of the parent process a separate kernel stack in a first memory location, the first memory location including a plurality of memory segments containing at least one kernel stack;
   (b) in response to the initiation of a fork by the calling thread, switching to the kernel stack of the calling thread in the first memory location;
   (c) copying the only kernel stack of the calling thread, which is located in a memory segment, to a second memory location, wherein the second memory location comprises process image information for the parent process, but does not comprise the kernel stacks of the non-calling threads of the parent process;
   (d) copying the second memory location to create a child process; and
   (e) after the child process has been created, switching back to the kernel stack of the calling thread back to in the first memory location.

2. The method according to claim 1 wherein step c comprises the steps of:
   determining if one of the threads other than the calling thread is currently performing a fork operation; and
   if at least one of the threads other than the calling thread is performing a fork operation, putting the calling thread to sleep until the other thread completes the fork operation.

3. The method according to claim 2 wherein step c further comprises the step of:
   if the threads other than the calling thread are not performing a fork operation, setting a flag to prevent the other threads from performing a fork operation.

4. The method according to claim 1 wherein the first memory location is a first segment.

5. The method according to claim 1 wherein the second memory location is a second segment.

6. A computer system for performing a fork operation of a parent process having at least two threads, wherein one thread is a calling thread, comprising:
   a processor for assigning each thread of the parent process a separate kernel stack in a first memory location, the first memory location including a plurality of memory segments containing at least one kernel stack;
   in response to the initiation of a fork by the calling thread, the processor for switching to the kernel stack of the calling thread in the first memory location;
   said processor for coping the only kernel stack of the calling thread, which is located in a memory segment, to a second memory location, wherein the second memory location comprises process image information for the parent process, but does not comprise the kernel stacks of the non-calling threads of the parent process;
   said processor for copying the second memory location to create a child process having the kernel stack of the calling thread; and
   after the child process has been created, said processor for switching back to the kernel stack of the calling thread in the first memory location.

7. The computer system according to claim 6 wherein said switching step comprises:
   said processor for determining if one of the threads other than the calling thread is currently performing a fork operation; and
   if at least one of the threads other than the calling thread is performing a fork operation, said processor for putting the calling thread to sleep until the other thread completes the fork operation.

8. The computer system according to claim 7 further comprising:
   if the threads other than the calling thread are not performing a fork operation, said processor for setting a flag to prevent the other threads from performing a fork operation.

9. The computer system according to claim 6 wherein the first memory location is a first segment.

10. The computer system according to claim 6 wherein the second memory location is a second segment.

* * * * *

UNITED STATES PATENT AND TRADEMARK OFFICE
CERTIFICATE OF CORRECTION

PATENT NO. : 5,717,926
DATED : February 10, 1998
INVENTOR(S) : Browning et al.

It is certified that error appears in the above-identified patent and that said Letters Patent is hereby corrected as shown below:

Column 6, line 37: change "coping" to --copying--

Signed and Sealed this

Ninth Day of June, 1998

Attest:

BRUCE LEHMAN

Attesting Officer                Commissioner of Patents and Trademarks